United States Patent Office 2,981,548
Patented Apr. 25, 1961

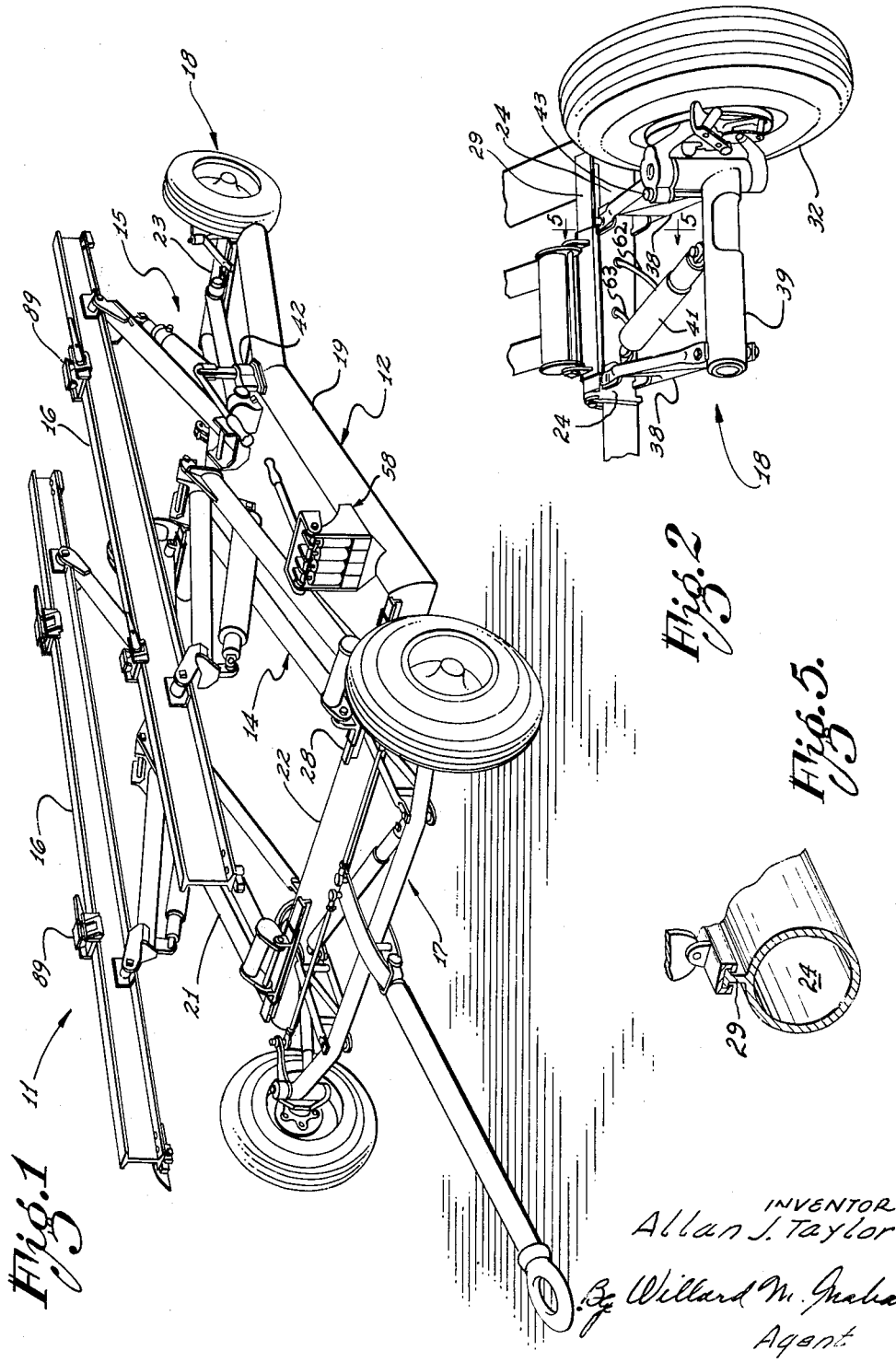

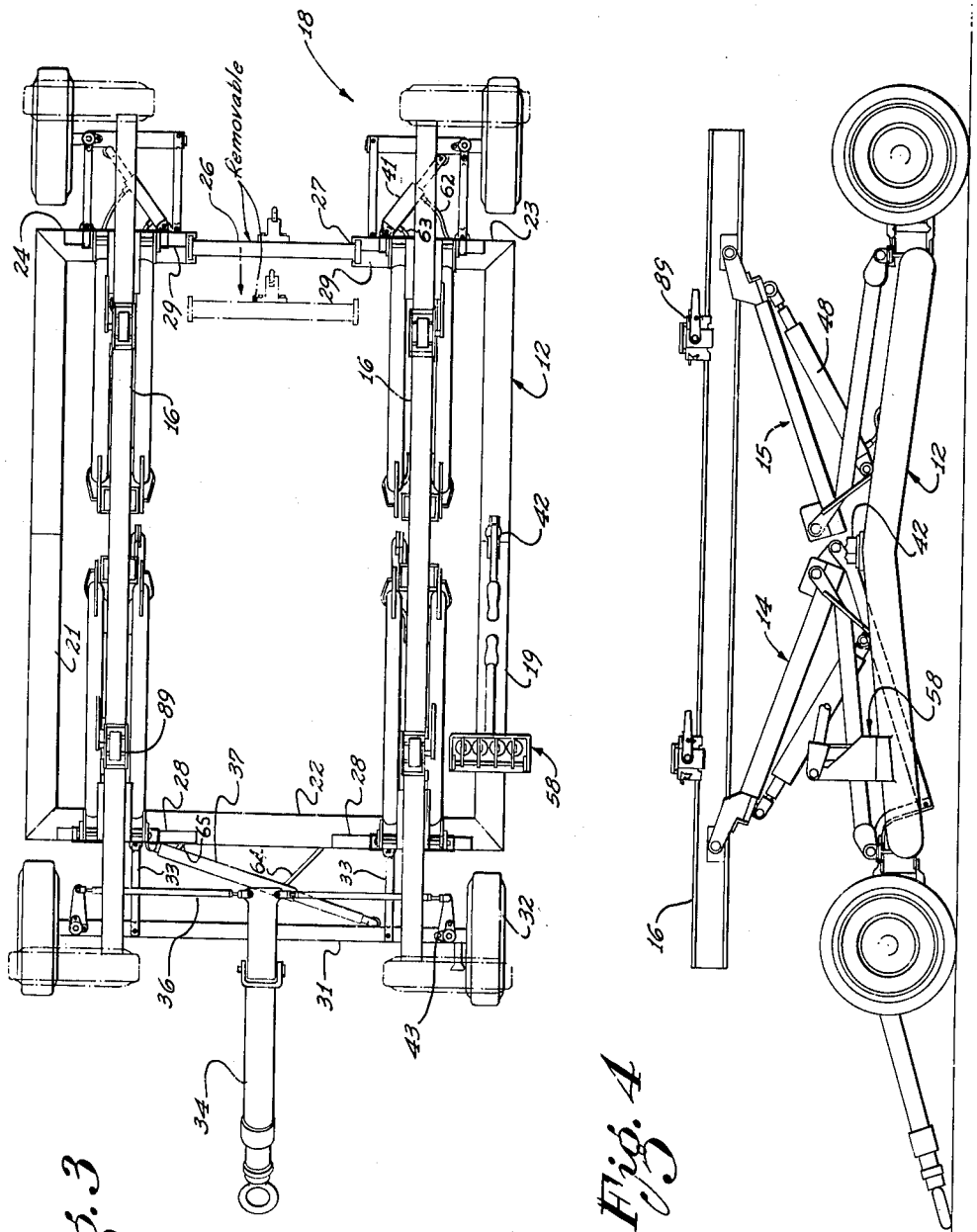

2,981,548

ELEVATING TRAILER WITH LATERALLY SHIFTABLE FRAME

Allan J. Taylor, Pacific Palisades, Calif., assignor to Northrop Aircraft, Inc., Hawthorne, Calif., a corporation of California Original application Nov. 27, 1956, Ser. No. 624,556, now Patent No. 2,929,519, dated Mar. 22, 1960. Divided and this application Oct. 8, 1959, Ser. No. 846,770

2 Claims. (Cl. 280—29)

This invention relates to material handling equipment and more particularly to elevating type dollies having general utility in the handling of heavy equipment and especially such components as jet aircraft engines and the like.

This application is a division of our copending application Serial No. 624,556, filed November 27, 1956, now Patent No. 2,929,519, which is directed to material handling equipment.

Briefly the present invention discloses an elevating type dolly the base structure of which is substantially rectangular when viewed in plan. Mounted on the base structure are a plurality of elevating linkages which in turn carry a pair of supporting rails on which equipment to be carried by the dolly may be mounted. The base structure itself is mounted on wheel assemblies located at each corner of the base structure. The wheel assemblies incorporate novel features by means of which the base structure, and equipment mounted thereon, may be shifted laterally while maintaining the wheels in their normal positions as shown by solid line construction in Figure 3.

Accordingly it is an object of the present invention to provide an elevating type dolly embodying wheel assemblies mounted at the fore and aft ends thereof in a novel manner to provide lateral movement of the supporting structure of the dolly with respect to the wheel assemblies.

Another object is to provide an elevating type dolly in which the base frame thereof is arched upwardly intermediate its end portions to provide adequate clearance at such times as the dolly is moved over a ramp or the like.

Another object is to provide an elevating type dolly which is light in weight and simple in design yet rugged in construction, economical to manufacture and which may be easily adapted to any purpose for which it is intended.

Although the characteristic features of the present invention are particularly pointed out in the appended claims, the invention itself, also the manner in which it may be carried out, will be better understood by referring to the following descriptions taken in connection with the accompanying drawings forming a part of this application and in which:

Figure 1 is a perspective view of the elevating dolly as disclosed herein.

Figure 2 is a fragmentary perspective view of the dolly of Figure 1 showing a typical rear wheel and linkage assembly.

Figures 3 and 4 are plan and elevational views, respectively, of the elevating dolly of Figure 1.

Figure 5 is a fragmentary perspective view partially in section of a rear wheel assembly as shown in Figure 2, the view being taken as indicated by the line 5—5 in latter figure.

Referring to the drawings and particularly Figure 1, an elevating dolly 11 of the type disclosed herein is shown. Principal components of the dolly consists of a base frame assembly 12, fore and aft individual linkage assemblies 14 and 15, respectively, mounted on the assembly 12 to provide supporting structure and means for elevating and lowering a pair of supporting rails 16. The dolly is rendered steerable and mobile by means of a steering and support assembly 17 and a pair of support assemblies 18. The steering and support assembly 17, located at the forward end of the frame assembly 12, is hereinafter referred to as the forward support assembly. The pair of support assemblies 18, located at the aft end of the frame assembly 12, are hereinafter referred to as the aft support assemblies.

In the present embodiment the frame assembly 12 preferably is constructed of welded aluminum tubing and consists of a pair of side members 19 and 21, a cross member 22, a pair of end members 23 and 24 and a removable member 26, as best seen in Figure 3. The member 22 extends laterally between the side members 19 and 21 at the forward ends of the latter members. The members 23 and 24 extend laterally inwardly from the aft ends of the side members and terminate in spaced relation with respect to each other to provide clearance or a passageway therebetween for a purpose which will become apparent as the disclosure progresses. Respective grooves 27 are provided in the terminal ends of the members 23 and 24 and are adapted to receive T-shaped ends of the removable member 26 when the latter is in position between the ends of the members 23 and 24.

The side members 19 and 21 are arched and have their highest portion adjacent their midsections as best seen in Figures 1 and 4. This construction insures adequate clearance between the side members and the supporting surface of a ramp or the like and also allows the side members and the dolly generally to be positioned nearer the ground than would otherwise be possible. Fore and aft laterally extending track members 28 and 29, mounted respectively on the cross-member 22 and lateral members 23 and 24, provide means for slideably securing the individual linkage assemblies 14 and 15 on the assembly 12.

Linkage means for both the forward and aft support assemblies 17 and 18 include parallelogram type linkages. The forward support assembly includes an axle 31 carrying a wheel 32 journaled at each end thereof. The axle 31 is pivotally attached to the member 22 by means of spaced connecting links 33 which when considered with the axle 31 and member 22 provide one of the aforementioned parallelogram linkages. The dolly is steered by means of a tow bar 34 and tie rods 36. Also extending diagonally between the member 22 and the axle 31 is a pivotally mounted hydraulic actuator 37 which acts to perform a function which will be apparent presently.

The aft support assemblies 18 are of similar construction, one being a right and one a left hand unit. The right hand assembly 18 is attached to the member 24 by means of spaced connecting links 38—38 (Figure 2) pivotally attached to the member 24 and the outer ends thereof are pivotally attached to a member 39 which in turn is pivotally attached to the journal of the right rear wheel 32. The links 38—38 have a parallel relationship and with the members 24 and 39 constitute another one of the aforementioned parellelogram linkages. Also extending diagonally between the members 24 and 39 is a pivotally mounted actuator 41. It will be apparent that the inner and outer ends of the links 38 (also the links 33) are attached to supporting structure at vertically aligned and spaced positions. Thus the support assemblies provide supports for the frame assembly 12 and maintain the latter at a predetermined height above a supporting surface.

The aft support assemblies 18 are provided with locking or positioning pins 43 enabling the wheels to be fixedly secure in two distinct positions. In one position the pins 43 retain the wheels in alignment with the longitudinal axis of the dolly 11 as shown by solid construction in Figure 3. In the other position the wheels are positioned normal to the longitudinal axis of the dolly as shown by phantom construction. The forward support assembly 17 is also provided with a pin 43 which functions in the same manner as the pins 43 associated with the assemblies 18. Thus it will be apparent that the wheels 32 can be locked in the latter position and the dolly 11 moved in a sidewise direction. As previously mentioned it is to be understood that the left hand support assembly 18 is constructed similarly as the right hand support assembly just described.

Hydraulic fluid for the actuators 37 and 41 is pressurized by a manually operated pump 42 mounted on the base frame 12 substantially as shown in Figures 1 and 3. In view of the above description it will be apparent that as pressurized fluid is supplied to the actuators 37 and 41, flowing through the connectors 62 and 63 (Figure 2), the frame assembly 12, also components carried by the supporting rails 16, will be moved laterally (either to the right or left) with respect to the wheels 32 or stationary structure.

The supporting rails 16 are mounted on the base frame assembly 12 for lateral and vertical movement thereon by means of the aforementioned fore and aft individual linkage assemblies 14 and 15, respectively. The linkage assemblies 14 and 15, as best seen in Figure 4, are similar in construction to those shown and described in applicant's copending application entitled Elevating Dolly, Serial Number 544,850, dated November 4, 1955, now Patent No. 2,896,909. The linkage assemblies 14 and 15 are slideably mounted on tracks 28 and 29 which in turn are secured to the cross member 22 and end members 23 and 24, respectively. Supporting fixtures 89, mounted on the supporting rails 16, provide means whereby components and equipment may be mounted on and transported by the dolly 11. Vertical movement is imparted to the rails 16 by means of hydraulic actuators 48 which are mounted on the individual linkage assemblies 14 and 15. Pressurized fluid for the actuators 48 is provided by a hand actuated pump assembly 58 mounted on the left side member 19 as best seen in Figure 1.

The component parts of the dolly 11 having been described the operation and novel features thereof will be pointed out and briefly discussed. If components of varying sizes (particularly of different widths) are to be handled by the dolly 11 it will be apparent that the linkage assemblies 14 and 15, located respectively on the same side of the dolly 11, may be moved either inboard or outboard on the tracks 28 and 29 as required to accommodate a particular component.

Lateral movement of the base frame assembly 12 and the elevating structure of the dolly 11, with respect to the wheels 32 or other reference structure, is imparted thereto by the actuators 37 and 41. By directing pressurized fluid to the fore and aft ends of the actuators 37 and 41 the assembly 12 will be caused to move as desired either to the right or left on the parallelogram linkages located at the fore and aft ends of the base frame assembly 12. Also lateral movement may be imparted to the complete dolly 11 by positioning the wheels 32 in the position shown by phantom construction in Figure 3.

While in order to comply with the statute, the invention has been described in language more or less specific as to structural features, it is to be understood that the invention is not limited to the specific features shown, but that the means and construction herein disclosed comprise a preferred form of putting the invention into effect, and the invention is therefore claimed in any of its forms or modifications within the legitimate and valid scope of the appended claims.

What is claimed is:

1. In an elevating dolly the combination comprising: a generally rectangular frame assembly; support assemblies mounted respectively adjacent the fore and aft end portions of said frame assembly and each including a pivotally mounted wheel; each of said support assemblies including a parallelogram type linkage pivotally connected to and extending between a respective wheel and said frame assembly to allow lateral movement of the latter with respect to said wheels; and actuator means adapted to impart said lateral movement to said frame assembly when actuated.

2. In an elevating dolly as set forth in claim 1; further characterized in that said support assemblies include an individual forward support assembly and a pair of individual aft support assemblies mounted respectively adjacent each aft corner portion of said frame assembly.

References Cited in the file of this patent

UNITED STATES PATENTS

| | | |
|---|---|---|
| 1,697,285 | Neighbour | Jan. 1, 1929 |
| 2,452,632 | Cameron | Nov. 2, 1948 |
| 2,634,988 | Porte | Apr. 14, 1953 |
| 2,706,881 | McDonald | Apr. 26, 1955 |
| 2,820,644 | Smith | Jan. 21, 1958 |